United States Patent [19]

Hover et al.

[11] Patent Number: 5,244,942
[45] Date of Patent: Sep. 14, 1993

[54] HOMOGENOUS, PARTICULARLY MULTICOLOR-STRUCTURED SYNTHETIC RESIN SHEET OR PANEL, AS WELL AS PROCESS FOR ITS PRODUCTION

[75] Inventors: Alexander Hover, Troisdorf-Spich; Manfred Simon, Niederkassel; Herbert Schulte, Troisdorf; Josef Becker, Neukirchen-Seelscheid; Richard Weiss; Hans-Joachim Kaseler, both of Troisdorf, all of Fed. Rep. of Germany

[73] Assignee: Huels Troisdorf AG, Fed. Rep. of Germany

[21] Appl. No.: 936,889

[22] Filed: Aug. 31, 1992

Related U.S. Application Data

[63] Continuation of Ser. No. 499,395, filed as PCT/EP88/01103, on Dec. 3, 1988, abandoned.

[30] Foreign Application Priority Data

Dec. 19, 1987 [DE] Fed. Rep. of Germany ....... 3743296
Dec. 19, 1987 [DE] Fed. Rep. of Germany ....... 3743297

[51] Int. Cl.$^5$ .................. C08L 23/08; C08K 3/00; B29C 43/30; C08J 5/18; C08J 3/20
[52] U.S. Cl. .................................... 523/171; 524/914; 524/563; 524/524; 524/447; 524/427; 524/426; 525/222; 525/198; 525/197; 264/75; 264/76; 264/77; 264/245
[58] Field of Search .................. 525/222; 523/171; 524/914, 524, 447, 427; 264/76, 78

[56] References Cited

U.S. PATENT DOCUMENTS

| | | | |
|---|---|---|---|
| 2,729,770 | 1/1956 | Robbins | 317/2 |
| 3,015,640 | 2/1962 | Weaver et al. | 523/171 |
| 3,082,179 | 3/1963 | Miller et al. | 523/171 |
| 3,156,666 | 11/1964 | Pruett | 260/41 |
| 3,370,024 | 2/1968 | Grasko et al. | 525/222 |
| 3,573,237 | 3/1971 | Zola | 525/931 |
| 3,700,366 | 10/1972 | Placente | 451/71 |
| 3,737,274 | 6/1973 | Coffin et al. | 425/364 |
| 4,191,798 | 3/1980 | Schumacher et al. | 428/95 |
| 4,250,064 | 2/1981 | Chandler | 525/524 |
| 4,263,196 | 4/1981 | Schumacher et al. | 524/563 |
| 4,371,642 | 2/1983 | Jaffe | 524/563 |
| 4,379,190 | 4/1983 | Schenck | 524/524 |
| 4,396,566 | 8/1983 | Brinkmann et al. | 264/70 |
| 4,430,468 | 2/1984 | Schumacher | 524/524 |
| 4,594,211 | 6/1986 | Mohnhaupt | 523/171 |
| 4,614,556 | 9/1986 | Fry et al. | 428/158 |
| 4,708,978 | 11/1987 | Rodgers | 524/5 |
| 4,923,658 | 5/1990 | Hover et al. | 264/76 |

FOREIGN PATENT DOCUMENTS

| | | |
|---|---|---|
| 0106148 | 4/1984 | European Pat. Off. . |
| 0046526 | 2/1987 | European Pat. Off. . |
| 829060 | 1/1952 | Fed. Rep. of Germany . |
| 1124862 | 3/1962 | Fed. Rep. of Germany . |
| 1129267 | 6/1971 | Fed. Rep. of Germany . |
| 3306776 | 8/1984 | Fed. Rep. of Germany . |
| 3336743 | 4/1985 | Fed. Rep. of Germany . |
| 3546184 | 7/1987 | Fed. Rep. of Germany . |
| 3546215 | 7/1987 | Fed. Rep. of Germany . |
| 2035670 | 12/1970 | France . |
| 68674 | 1/1953 | United Kingdom . |
| 75644 | 9/1956 | United Kingdom . |

OTHER PUBLICATIONS

Prospectus of Nipoflex "Ethylene-Vinyl Acetate Copolymer"—Nippon Polychemicals Co. Ltd.

Primary Examiner—Carman J. Seccuro, Jr.
Attorney, Agent, or Firm—Antonelli, Terry, Stout & Kraus

[57] ABSTRACT

The invention concerns a homogenous, in particular multicolored plastic sheet or panel, based on ethylene vinyl acetate copolymer (EVA) as binder with a filler content of 30 to 80 wt. % and a process for producing it. In other embodiments the binder contains, in addition to the 70 to 85 wt. % of EVA, polypropylenes to improve the processability (tendency to adhere), EPDM to improve the flexibility, and polyethylenes to reduce the tendency to soiling. In the process described, several additives, each consisting of a binder containing at least some ethylene vinyl acetate copolymer, up to 80 wt. % of fillers and up to 5 wt. % of pigments, are mixed, plasticized and granulated or comminuted to form granules or chips of assorted colours which are mixed and, possibly after other processing operations, pressed to form the plastic web or plates.

23 Claims, No Drawings

HOMOGENOUS, PARTICULARLY MULTICOLOR-STRUCTURED SYNTHETIC RESIN SHEET OR PANEL, AS WELL AS PROCESS FOR ITS PRODUCTION

This application is a continuation application of application Ser. No. 499,395, filed as PCT/EP88/01103, on Dec. 3, 1988, now abandoned.

BACKGROUND OF THE INVENTION

The invention relates to a homogeneous, multicolor-structured synthetic resin sheet or panel in accordance with the preamble of claim 1, as well as to a process for its production in accordance with the preamble of claim 7.

Homogeneous synthetic resin sheets or panels along the lines of the present invention are understood to be flat articles fashioned of a single layer and having physical properties that are uniform (homogeneous) from the topside to the underside. Such homogeneous plastic sheeting or panels are utilized, as floor covering and optionally also as wall paneling. On account of the homogeneous structure, these coverings can be used even in case of great stress, especially abrasion, since the optical and physical characteristics of the surface are hardly altered even under relatively vigorous abrasion Nonhomogeneous floor coverings are likewise available commercially exhibiting, for example, a thin surface coating, i.e. having a multilayer structure. However, nonhomogeneous floor coverings are far inferior to the homogeneous coverings with respect to their utility properties.

Essential criteria for the quality of plastic sheets or panels having a multicolored structure reside in the esthetic outer appearance and the wear characteristic.

State of the Art

Homogeneous, multicolor-structured synthetic resin sheets or panels, as well as processes for their manufacture have been known, for example, from DE-C-1,679,822 (=U.S. patent application No. 3,761,555), DE-C2-3,235,166 (=EP-C2-0,106,148), DE-C2-3,324,480, DE-A1-3,507,655, and EP-A2-0,227,029, relating respectively to the production of multicolor-marbled, homogeneous plastic sheeting of a thermoplastic synthetic resin based on PVC.

The wearproofness (abrasion resistance) of the known homogeneous floor coverings depends especially on the filler content of the batch utilized in manufacture. Mixtures are customary which are made of about 60-80% by weight of plasticizer-containing PVC as the binder, with a plasticizer proportion of 40-60% by weight, as well as 20-40% by weight of a filler such as, for example, calcium carbonate. The wear resistance of such a covering according to the state of the art rises with increasing binder content (synthetic resin proportion). However, too high a binder content makes the product substantially more expensive. Therefore, heretofore a compromise had to be sought in all cases between adequate wear resistance and acceptable costs for the goods used as raw material.

EP-A2-0,227,029, dealing with this field of art, discloses the use of ethylene-vinyl acetate copolymer (EVA) as a binder for floor coverings, the proportion of EVA in the total batch amounting to 69% by weight. Such sheets or panels, though exhibiting high wear resistance, are tacky above about 80° C. and thus can hardly be processed, on account of their high vinyl acetate content (approximately 20% based on the total batch). Moreover, such a covering is so soft that it cannot be utilized for flooring.

DE-A1-3,241,395 (=U.S. patent application No. 4,455,344) describes a method for producing a highly filled granulate usable especially for injection molding, made up of 60-90% of pulverulent filler as well as two different, powdery thermoplastics of a defined grain structure with proportions of respectively 5-35%. The various plastic powders must exhibit differing melting points since in granulate production only one of the two binder components is melted. In this method, inhomogeneous granulates are produced wherein the higher-melting component is distributed in a crystalline, grainy texture. EVA has also been mentioned as the low-melting granular component.

In all processes for the production of multicolor-structured plastic sheets or panels known thus far, the transitions in color structure, especially marbling, are not sharply contoured but rather are more or less "washed out". It has heretofore been impossible to create, for example, finely enchased, ornamental structures.

SUMMARY OF THE INVENTION

It is an object of the present invention to improve homogeneous synthetic resin sheets or panels of this type which have a multicolor structure, especially a marbled structure, so that the esthetic outer appearance of the flat articles is enhanced and the wear resistance, based on the proportion of binder content to filler content, is increased.

Another object of the invention resides in making available a product which does not contain any plasticizers and is of equal quality as or superior to the conventional PVC coverings with respect to the physical properties.

DETAILED DESCRIPTION OF THE INVENTION

This object has been solved in accordance with this invention by a homogeneous, particularly multicolor-structured synthetic resin sheet or panel with a binder, fillers, and optionally auxiliary agents, wherein the binder contains predominantly ethylene-vinyl acetate copolymer, the vinyl acetate proportion in the total batch of the synthetic resin sheet or panel amounts to 3-14% by weight, and the proportion of the fillers, including the auxiliary agents, amounts to 35-80% by weight of the total batch.

It has been found surprisingly that the use, in accordance with this invention, of a batch containing a binder with at least 50% by weight of ethylene-vinyl acetate copolymer, as well as up to 80% by weight of a filler and up to 5% by weight of a color component results in synthetic resin sheets or panels exhibiting physical properties far superior to all known coverings based on PVC. In particular, the wear resistance of the synthetic resin sheets and panels produced according to this invention, as compared with comparable products based on PVC, is better by about 100%, with an identical filler content in the batch and an identical processing technique during the manufacturing procedure. Moreover, the use, in accordance with this invention, of a binder based on ethylene-vinyl acetate copolymer permits substantially higher filler proportions in the total batch than possible with the use of plasticizer-containing PVC as the binder—as customary according to the state of the art.

The surprisingly possible use of high filler proportions compensates, for example, for the higher price of EVA as compared with PVC, so that the covering according to this invention is competitive also in regard to pricing with respect to PVC coverings It has furthermore been discovered surprisingly that also the optical (esthetic) properties of the plastic sheets or panels manufactured according to this invention are substantially superior to those known from the prior art. The process of this invention makes it possible for the first time to manufacture coverings of a multicolored structure and being, especially, marbleized, exhibiting a sharp demarcation of the color transitions down to the smallest detail, and no "blurred" structures.

With an otherwise identical processing technique, a covering based on plasticizer-containing PVC has rather fuzzy contours in marbling whereas a covering manufactured according to this invention with a binder based on ethylene-vinyl acetate copolymer shows sharply demarcated, finely enchased color structures.

According to the present invention, several batches, in each case consisting of a binder, up to 80% of a filler, and up to 5% of a color component, are processed in a first process step into inherently unicolored granulates or chips One of the batches herein can also be of transparent quality, i.e. without a color component while the remaining batches in each case contain a different color component.

Examples of suitable fillers are chalk, kaolin, talc, wood flour or quartz powder. Additionally, processing aids and antistats can likewise be added.

The binder consists entirely or partially of an ethylene-vinyl acetate copolymer (EVA); it is also possible to mix various types of EVA with one another.

Preferably, types of EVA are utilized having a vinyl acetate proportion (VA proportion) of 14–45% of the EVA proportion, wherein the VA proportion of the total batch of binder, filler, color component and optionally further auxiliary agents should be about 3–14% by weight, and the proportion of the binder should be 20–65% by weight, preferably 25–50% by weight, and especially 25–40% by weight of the total batch.

In particular, EVA types having a VA proportion of 18–40% by weight, based on the EVA proportion, have proven themselves well. By the use of mixtures of different ethylene-vinyl acetate copolymers with varying vinyl acetate proportions, the material properties of the finished covering can be influenced, especially with regard to hardness and wear characteristic; in this connection, higher vinyl acetate proportions have the tendency to result in softer synthetic resin sheets or panels, and higher ethylene proportions in the EVA copolymer tend to lead to harder plastic sheets or panels.

In contrast to PVC floor coverings, the binder according to this invention involves a plasticizer-free system which yet offers the possibility to obtain, depending on the acetate proportion in the copolymer and/or binder compound, a bandwidth of hard to soft quality without having to tolerate the disadvantages of plasticizer-containing batches.

Essential drawbacks of plasticizer-containing binders are:

Plasticizers migrate into the adhesive used for cementing the floor or wall coverings and can thereby impair adhesion to such an extent that bubble formation can arise in case of stresses, or a floor covering can even be destroyed by shrinkage, embrittlement, and crack formation.

Plasticizers can bleed out whereby a floor covering becomes a dirt catcher, the cleaning of which presents problems.

Plasticizers constitute a channeling system for migrating coloring agents. Discolorations that have penetrated in this way can no longer be removed.

Plasticizers, especially the phthalic acid esters utilized worldwide, primarily DOP [di(2-ethylhexyl) phthalate], are volatile to a certain degree and can accordingly pollute the atmosphere.

Another significant advantage of the panels and sheets of this invention resides in that a very high proportion of filler can be incorporated, without the addition of liquid components as used for plasticizers in floor coverings; the thus-attained wear characteristics far surpass those of plasticized PCV floor coverings.

It has been found surprisingly that the homogeneous synthetic resin sheets or panels according to this invention with EVA as the binder exhibit high-quality usage properties, especially when utilized as floor coverings, with filler contents of up to 80% by weight, but particularly with filler contents of 50–75% by weight, while in contrast thereto coverings on the basis of plasticized PVC and having high-quality properties can only have filler contents up to maximally 40% by weight.

Inasmuch as pure EVA copolymer is very tacky at the processing temperatures and therefore can be processed only with difficulties, a preferred embodiment of the invention provides for using a mixture of ethylene-vinyl acetate copolymer and an olefin homopolymer and/or an olefin copolymer wherein the proportion of the olefin (co)polymer in the total batch is about 0–15% by weight, preferably 2–13% by weight and especially 3–10% by weight. The proportion of the olefin (co)polymer in the binder preferably amounts to up to 40% by weight, especially up to 35% by weight.

Olefin homopolymers and among these especially polyethylene and especially preferably polypropylene are utilized with preference. With a polyolefin component, particularly a homopolyolefin component as the second component in the binder, there is, in spite of the fact that the proportion in the total batch may be merely small, on the one hand a decisive improvement in the processing characteristics and on the other hand the attainment of superior usage properties. A completely surprising aspect resides in that, in particular, the tackiness at the processing temperature is eliminated and/or the onset of tackiness is shifted to higher temperatures. The temperature at which a certain batch exhibits onset of tackiness is determined by the following measurement: a strip having a thickness of about 2 mm and a width of 10 mm from a panel produced by mixing, plastifying the mixture, and press molding from the batch to be tested is placed for 3 minutes on a heated Kofler bench and pulled off. During this test, the temperature ("tackiness temperature") is determined at which the test strip begins to adhere to the Kofler bench.

A batch consisting, for example, of 30% by weight of EVA with a VA content of 28% by weight and 69% by weight of chalk, as well as 1% by weight of colorant has a "tackiness temperature" of about 110° C. A batch of 20% by weight of EVA (28% by weight of VA), 10% by weight of polyethylene, 69% by weight of chalk and 1% by weight of colorant has a tackiness temperature of about 135° C., and a corresponding batch with 27% by weight of EVA (28% by weight of VA) and 3% by weight of polypropylene ("Novolen" 1300 E) has a tackiness temperature of about 200° C.

The addition of polyolefins in small quantitative proportions does result in higher processing temperatures, but these can be by far overcompensated by the higher tackiness temperatures. By addition of the especially preferred polypropylene to the EVA, however, the hardness of the finished covering is increased. Therefore, according to a preferred embodiment of the invention, it is suggested to utilize an ethylene-propylene copolymer (EPM/EPDM) in small amounts of about 1-5% by weight, based on the proportion of binder. The small portion of EPDM (or EPM) again compensates for the increase in hardness due to polypropylene addition, without exerting a negative influence on the processing conditions (tackiness temperature).

The covering according to this invention is less susceptible to attracting dirt than plasticizer-containing PVC coverings of the same hardness. It has been found surprisingly that a further increase in dirt repellence can be achieved by using a polyethylene homopolymer in small amounts, preferably 1-5% by weight, based on the proportion of binder. Even very minor PE proportions of less than 3% by weight, based on the binder proportion, and less than 1% by weight, based on the total batch, decisively improve the dirt repellence of the covering according to this invention.

Additional preferred embodiments of the invention can be seen from claims 2-6.

According to a first preferred embodiment of the invention, chips are produced (first process step) on a commercially available rolling mill known to a person skilled in the art, these chips being each differently colored but in themselves being of a single color. First of all the binder component is preferably introduced and plastified at about 110°-150° C., especially at a temperature of about 120°-130° C. In case, additionally to an EVA copolymer, still other EVA types and/or other binder components, such as polypropylene, are employed, then these are processed in this process step simultaneously homogeneously into the thermoplastic binder composition. Subsequently, the proportion of filler as well as optionally the coloring component and other auxiliary agents are introduced onto the thus-plastified rolled slab of binder and uniformly kneaded with the plastified binder into a unicolored rolled slab which is then comminuted, for example by grinding, into unicolored chips. Several batches of respectively unicolored, but different-color chips are then mixed (second process step) and further processed. The individual chips have a thickness, in correspondence with the thickness of the rolled hide, of about 0.5-5 mm, preferably 1.5-3 mm with an average diameter of 2-15 mm, preferably 3-10 mm.

According to an especially preferred embodiment of the invention, for producing mutually differently colored, but inherently unicolored granulates (first process step), the binder proportion and the filler proportion as well as optionally the coloring component as well as further auxiliary agents are uniformly mixed in a commercially available mixer known to one skilled in the art below the softening temperature of the binders employed, especially at room temperature. This mixture is then fed into a commercially available granulating extruder and, with complete plastifying, processed into inherently unicolored granules. The individual granules have average dimensions of about 1-10 mm, preferably 2-8 mm, and especially 3-5 mm. Several batches of in each case unicolored batches which are, however, of different colors, are subsequently mixed (second process step) and further processed.

Optionally, it is also possible to mix granules and chips together in accordance with the above-described mode of operation, and process them further in accordance with this invention.

The mixture of chips and/or granulates of different colors but inherently unicolored can, in the simplest case, be directly press molded into the plastic sheets or panels wherein the chips or granulates must exhibit a temperature corresponding approximately to the plastifying temperature of the binders employed or lying above this temperature in order to achieve fusion of the chips or granules with one another The press molding step herein can take place either discontinuously, for example in single-platen or multiple-platen presses under pressures of 2-200 bar, or continuously by exerting an areal pressure of 2-200 bar, for example in twin belt presses, or, finally in a calendering or rolling procedure by press molding in the roll nip.

The floor coverings or similar items manufactured in accordance with this simplest version of the process differ in their optical appearance substantially from similarly produced coverings on PVC basis; in particular, the color structuring between the individual, fused-together granules or chips is substantially clearer and sharper.

However, preferably, prior to the step of press molding, a multicolored marbled composition is produced in interposed process steps from the mixture of mutually differently colored but inherently unicolored granulates or chips; this composition can be directly shaped and press molded into the synthetic resin sheets or panels or it can initially be processed into inherently marbled chips or granules whereafter these inherently marbled chips or granules are further processed by additional process steps into the plastic sheets or panels.

The initially inherently unicolored chips or granules which are of differing colors can be processed according to a first version of the process into a multicolor-marbled rolled slab on a conventional rolling mill. The individual chips or granules are plastified, fused together, and incompletely (inhomogeneously) mixed (kneaded) in order to produce the marbling effect. The thus-marbled rolled hide can then be press molded continuously or discontinuously, for example by using multiple-platen presses, rolling mills, calenders, twin belt presses, or similar devices. However, preferably the marbled rolled slab is comminuted—for example by means of a mill—into inherently marbleized chips which are then further processed.

According to a preferred embodiment of the invention, the initially inherently unicolored chips or granules having different colors are mixed together and, by means of an extruder, plastified and incompletely intermixed (kneaded) by shear stress to form a multicolored marbled composition which is forced through a die and granulated to inherently multicolor-marbled granulates which are then further processed. The extruder must have such a screw geometry that too vigorous an intermixing and/or kneading of the plastified composition is avoided; single-screw granulating extruders having screw lengths of 8-15 D are employed with preference.

The inherently marbled chips or granules produced as set forth above are then again heated to plastifying—optionally also after blending differently colored batches etc.—and press molded into synthetic resin sheets or panels showing multicolored marbling. Press molding, in turn, takes place by continuous or discontinuous processes, for example by means of multiple-platen presses, rolling mills, calenders, or twin belt presses. In this connection, rolling mills with textured rolls are especially preferred, as described in German Patent 3,235,166-C2, as well as, in particular, twin belt presses according to DOS 3,546,184-A1. It has been discovered surprisingly that, when press molding by means of a twin belt press according to DOS 3,546,184-A1, the wear properties of the thus-manufactured plastic sheeting are even more substantially improved over those of sheeting press molded with conventional rolling mills.

After the press molding step, the synthetic resin sheets or panels can be further treated, if necessary, in accordance with methods known per se. Among these are, in particular, cutting, superficial grinding, polishing, embossing, heat-treating, cutting to size, etc.

Ways of Realizing the Invention

The invention will be described in greater detail below with reference to several practical examples:

EXAMPLE 1

The following batch was used:
Binder: 30% by weight of EVA with 28% by weight VA proportion ("Escorene" UL 00728, Exxon)
Filler: 69% by weight of chalk ("Juraperle" MHM, Ulmer Füllstoff)
Colorant: 1% by weight First of all, the binder was introduced into a rolling mill heated to 130° C. and, after formation of the rough slab, combined with filler and colorant (rolling time 10 minutes). The thus-produced hide was taken off, cooled, and then ground on a Pallmann mill with a screen of 5 mm mesh. In this way, using four different dyes, four correspondingly dyed rough hides were manufactured and ground into chips. A mixture of these chips was press molded, after filling a press mold having a thickness of 2 mm, under the following press molding conditions

| Pressure | 100 bar |
| Temperature | 130° C. |
| Press molding time | 5 minutes | into panels with a sharply structured, multicolored design having the excellent properties of a floor covering.

| Properties | |
| --- | --- |
| Thickness [mm] | 2.047 |
| Bulk density [g cm$^{-3}$] | 1.738 |
| Shore C hardness according to DIN 53505 (Apr. 1967) | 77.3 (10 s) |
| Wear test according to DIN 51963-A (Dec. 1980): | |
| Weight loss [g] | 4.3 |
| Loss in thickness [mm] | 0.167 |

EXAMPLE 2

A batch made up as follows
Binder: 22.5% by weight of EVA with 28% by weight VA proportion ("Riblene" D JV 1055X, Enichem) 7.5% by weight of polypropylene ("Novolen" 1300E, BASF)
Filler: 48% by weight of chalk ("Calcilit" 8, Alpha) 20% by weight of kaolin (Grade RC 32, Sachtleben)
Colorant: 1% by weight
Lubricant: 1% by weight of calcium stearate ("Ceasit" I, Baerlocher)

was mixed in a Papenmeier high-speed mixer at room temperature for 3 minutes and fed continuously into a twin screw extruder "Reifenhaeuser" BT 55, plastified, and granulated through a screen plate with 3.5 mm hole diameter and revolving blade.

| Zone 1 | Zone 2 | Zone 3 | Zone 4 | Zone 5 |
| --- | --- | --- | --- | --- |
| 140° C. | 140° C. | 160° C. | 160° C. | 160° C. |
| Zone 6 | Zone 7 | Zone 8 | Zone 9 | Zone 10 |
| 160° C. | 140° C. | 140° C. | 145° C. | 155° C. |

Screw speed [rpm]: 50
Throughput was 75 [kg/h]

The granulate prepared according to this example in four different colors was blended and filled into a mold having a thickness of 2 mm, and press molded as follows:

| Pressure | 100 bar |
| Temperature | 150° C. |
| Press molding time | 5 minutes |

The panel of four colors, structured in sharp delineation, had the following properties:

| Thickness [mm] | 2.028 |
| Bulk density [g cm$^{-3}$] | 1.715 |
| Shore C hardness according to DIN 53505 (Apr. 1967) | 83.3 (10 s) |
| Wear test according to DIN 51963-A (Oct. 1980): | |
| Weight loss [g] | 6.647 |
| Loss in Thickness [mm] | 0.26 |

EXAMPLE 3

The four differently dyed granulates produced in accordance with Example 2 were mixed and processed on a rolling mill at a temperature of 180° C. into a marbled rough slab wherein the granules in the roll nip were fused together by shear stress and were incompletely intermixed. Subsequently, the rough slab was press molded into a panel under the following conditions:

| Pressure: | 110 bar |
| Temperature: | 160° C. |
| Press molding time: | 2 minutes |

In this way, a finely structured, multicolored panel of marble-like appearance and having the physical properties set out below was obtained:

| Thickness [mm] | 2.047 |
| Bulk density [g cm$^{-3}$] | 1.738 |
| Shore C hardness according to DIN 53505 (Apr. 1967) | 77.3 (10 s) |

| Wear test according to DIN 51963-A (Dec. 1980): | |
| --- | --- |
| Weight loss [g] | 5.15 |
| Loss in thickness [mm] | 0.20 |

EXAMPLE 4

Four differently dyed granulates were produced according to Example 2 and mixed in the following ratio

| white | 40% by wt. | beige | 40% by wt. |
| --- | --- | --- | --- |
| grey | 20% by wt. | brown | 20% by wt. |

This granulate mixture was press molded and granulated in a single screw extruder with a screw diameter D of 42 mm, a length of 12 D, through a screen plate having a hole diameter of 2.7 mm. The granules filled into the extruder were plastified, fused together, and mixed incompletely by the shear forces (kneaded) so that the individual colors remained preserved, but the individual granules were fused together into a marbleized composition which then was once more granulated into inherently marbled granules.

The extrusion conditions were:

| Screw speed of revolution | 60 rpm |
| --- | --- |
| Temperature | 145° C. |
| Cutting blade | 1,200 rpm |

The still hot, inherently marbled granulate was poured via a conveying system and a pouring device into a layer of extensively constant bulk height. The layer of molding granules was preheated with infrared radiators and compressed under heat and pressure in a continuously operating twin belt press according to DOS 3,546,184-A1. The temperature of the heating drum was 180° C. The second half of the press was cooled, and the cooled sheeting, having a thickness of about 5 mm, was continuously cut apart in the center and in each case abraded on both sides, the topside being treated with a grinding belt of 100 gauge grain and the underside being treated with a grinding belt of 50 gauge grain, to a final thickness of 2.2 mm. The thus-produced grinding dust can be reused in accordance with Example 10, if desired.

The thus-calibrated sheeting can optionally be cut into panels, or it can also be further processed with additional superficial embossing and/or smoothing.

Panels and sheets were thus produced having finely enchased, ornamental, clearly contoured, multicolored structures.

An additional embossing or smoothing can be effected, for example, by heating the ground sheet to about 100° C. and subsequent embossing in an embossing unit using chrome-plated rolls (peak-to-valley height 7 μm).

It is also possible to punch out panels from the ground-down sheeting and emboss such panels in a press under the following conditions:

| Pressure: | 100 bar |
| --- | --- |
| Temperature: | 120° C. |
| Press molding time: | 15 minutes |

The physical characteristics were (after calibrating):

| Thickness [mm] | 2.027 |
| --- | --- |
| Bulk density [g cm$^{-3}$] | 1.710 |
| Shore C hardness according to DIN 53505 (Apr. 1967) | 77.0 |
| Wear test according to DIN 51963-A (Dec. 1980): | |
| Weight loss [g] | 3.5 |
| Loss in thickness [mm] | 0.14 |

In this mode of performing the process, an especially remarkable feature resides in the once more substantially improved wearing properties, as compared with Example 3, in spite of the use of an identical batch.

EXAMPLE 5

The following batch
Binder: 30% by weight of EVA with 28% by weight of VA ("Riblene" DJV 1055X, Enichem)
Filler: 68.5% by weight of chalk ("Juraperle" MHM)
Colorant: 1.0% by weight
Antistat 0.5% by weight ("Hostalub" FA 1, Hoechst)
was granulated in accordance with Example 2 in four different colorations, and the inherently unicolored granules were mixed at equal parts. Of this granulate mixture, 81.5 parts by weight was then mixed with 18.5 parts by weight of an EVA granulate (transparent, 28% by weight of EV, grade: "Riblene" DJV 1055X) and processed corresponding to Example 4.

The physical properties showed a particularly high abrasion resistance, not attainable by far with plasticized PVC floor coverings at such a high degree of filler.

| Properties | |
| --- | --- |
| Thickness [mm] | 2.146 |
| Bulk density [g cm$^{-3}$] | 1.517 |
| Shore C hardness according to DIN 53505 (Apr. 1967) | 64.6 |
| Wear test according to DIN 51963-A (Dec. 1980): | |
| Weight loss [g] | 2.0 |
| Loss in thickness [mm] | 0.091 |

EXAMPLE 6

A batch according to Example 2 was mixed in a powder mixer with rotor for 3 minutes at room temperature and continuously processed into granulate via a cellular charging gate and a metering unit (conveyor screw) in a Werner and Pfleiderer extruder "Kombiplast", consisting of a twin screw ZDSK with conveying and kneading zones and a single discharge screw AES with perforated plate (bores 3.5 mm) and a rotating cutter blade.

The process conditions were:

| Twin screw ZDSK | | | | 300 rpm | |
| --- | --- | --- | --- | --- | --- |
| Temperatures | | | | | |
| Zone 1 | Zone 2 | Zone 3 | Zone 4 | Zone 5 | Zone 6 |
| 180° C. | 180° C. | 100° C. | 140° C. | 140° C. | 180° C. |

The granulates produced in this way in four different colors were further processed in accordance with Example 4.

Finely structured designs were obtained.

EXAMPLE 7

A batch according to Example 2 was mixed with 3% by weight of an antistat (sodium alkyl sulfonate, grade "Lankrostat" DP 6337, Lankro) and processed in accordance with Examples 2 and 4. In addition to the physical properties disclosed in the remaining examples, this batch exhibited a leakage resistance according to DIN 51953 of $2.8 \times 10^6$ ohms. On this basis, a conductive floor covering could be manufactured.

EXAMPLE 8

The batch of Example 2, processed into granulate in correspondence with Example 6, was produced in 4 colors; the latter were mixed in a weight ratio of 4:4:1:1 and granulated according to Example 4 in a single screw extruder into marbleized granules.

The extrusion conditions were

| | |
|---|---|
| Screw speed of revolution | 60 rpm |
| Temperature | 125–130° C. |
| Throughput | 40 kg/h |
| Number of revolutions of cutter blade | 1,200 rpm |

The still hot, marbleized granulate was fed via a conveying system into a rolling mill corresponding to German Patent 3,235,166 C2 with knurled rolls with the following characteristics: The two-high rolling stand is specially profiled and permits the production of a compact, homogeneous rolled slab without further aftertreatment in a thickness of 2–3 mm with surface profiling. The structuring of the roll surface consists, in detail, of, for example, truncated pyramids forming in spiral arrangement a network of pyramids on the roll surface. The surface structure can, however, also be cylindrical, rectangular, square, or rhombic. An extensively direction-free design is thus obtained.

The resultant sheet was ground on one side to 2.1–2.2 mm and embossed with a smooth surface in a press at 140° C., 100 bar within 30 minutes. The ground sheeting likewise lent itself to smoothing by way of a belt and/or roll embossing step. As compared with a PVC batch, a more finely structured and grainy design was obtained whereas the structures in case of plasticized PVC turned out to be very coarse and with a larger area of their flat surfaces.

The physical properties were:

| Properties | |
|---|---|
| Thickness [mm] | 2.027 |
| Bulk density [g cm$^{-3}$] | 1.710 |
| Shore C hardness according to DIN 53505 (Apr. 1967) | 72.0 |
| Wear test according to DIN 51963-A (Dec. 1980): | |
| Weight loss [g] | 4.5 |
| Loss in thickness [mm] | 0.18 |

EXAMPLE 9

The still hot, marbleized granulate according to Example 8 was poured to a layer of extensively constant accumulated height by way of a conveying system and a pouring unit. The layer of shaped granules was preheated with infrared radiators and compacted under heat and pressure in a continuously operating twin belt press according to DOS 3,546,184-A1. The temperature of the heating drum was 180° C. The second half of the press was cooled, and the cooled sheet, having a thickness of about 5 mm, was continuously cut through and in each case ground on both sides, the topside with a grinding belt of 100 gauge grain and the bottom side with a grinding belt of 50 gauge grain, to achieve a final thickness of 2.2 mm.

| | |
|---|---|
| Thickness [mm] | 2.200 |
| Bulk density [g cm$^{-3}$] | 1.710 |
| Shore C hardness according to DIN 53505 (Apr. 1967) | 77.0 |
| Wear test according to DIN 51963-A (Dec. 1980): | |
| Weight loss [g] | 3.4 |
| Loss in thickness [mm] | 0.13 |

A comparison of Examples 8 and 9 shows that the final press molding of the granulate mixture has a decisive influence on the wearproofness of the synthetic resin sheets: While the sheet produced means of a profiled pair of rolls showed a loss in thickness of 0.18 mm during the wear test according to DIN 51963-A (Dec. 1980), the corresponding measured value according to Example 9 was 0.13 mm. It is to be noted, in this connection, that the sheet of Example 8 still shows substantially better wearing properties than conventional sheets based on PVC with the same filler proportion.

EXAMPLE 10

In accordance with Example 2, four batches of differently colored granules were produced and mixed in the following ratio

| | | | |
|---|---|---|---|
| white | 40% by weight | beige | 40% by weight |
| grey | 20% by weight | brown | 20% by weight |

This granulate mixture was blended with 20% by weight of a grinding dust as obtained according to Example 4 and pressed, in a single screw extruder having a screw diameter D of 42 mm, length 12 D, through a perforated plate having a hole diameter of 2.7 mm, and granulated.

Additionally to the thus-produced marbled granulates, edge cuttings from sheeting according to Example 4 were ground into chips with a "Condux" cutting mill, type CS 300/400 N 2 with a 14 mm screen, incorporated into the mixture with a proportion of 25% by weight, and further processed by means of a knurled roll mill according to Example 8. In contrast to PVC materials wherein the addition of reclaimed material results in grave optical alterations of the finished plastic sheeting, the sheets in accordance with Example 10 exhibited the same color structure as sheets manufactured without a proportion of reclaim.

In order to demonstrate the superior physical properties of the process according to this invention, comparative tests were made with various batches; in the table set out below, a batch based on EVA with admixture of polypropylene as the binder is in each case contrasted to a batch based on plasticized PVC. The wear resistance values were determined as loss in thickness according to DIN 51963-A (Dec. 1980). The fillers and the way of performing the process were selected to be in accordance with Example 3 for all tests; merely the binder proportion was varied from 25% by weight to 97% by weight. In case of the plasticized PVC batch, proportions of filler above about 60% by weight could not be realized. The results are represented in Table 1.

Table 1 shows that the covering according to this invention has a wear resistance that is, on the average, 100% higher as compared with a plasticized PVC covering manufactured according to the same method, with in each case identical filler proportion.

TABLE 1

| Batch Binder Weight % | Filler**) Weight % | EVA*) [mm] | Wear Property (Loss in Thickness) Plasticized PVC [mm] |
|---|---|---|---|
| 25 | 7 | 0.27 | Not Realizable |
| 30 | 70 | 0.20 | Not Realizable |
| 45 | 55 | 0.105 | 0.21-0.26 |
| 50 | 50 | 0.09 | 0.18 |
| 60 | 40 | 0.065 | 0.135 |
| 64 | 36 | 0.06 | 0.125 |
| 70 | 30 | 0.05 | 0.11 |
| 80 | 20 | ./. | 0.09 |
| 97 | 3 | ./. | 0.07 |

*)75% by weight of EVA (with 28% by weight VA proportion) and 25% by weight of polypropylene ("Novolen" 1300 E, BASF)
**)70% by weight of chalk ("Calcilit" 8) and 30% by weight of kaolin Table 2 set forth below lists additional embodiments of the invention (Examples 1, 11-15) with various binders and fillers. All of the examples were performed according to the method of Example 1; only the batch was varied.

Table 3 indicates additional Comparative Examples 16-21 wherein in each case the same binder was processed with varying quantitative proprotions of a filler. The process parameters correspond to Example 1.

Finally, Table 4 contains a comparison of Examples 22 through 25 in order to explain the effect of the polyolefins, utilized according to a preferred embodiment of the invention, as an additive to the binder. Those polyolefins and preferably polypropylenes are utilized which increase the tackiness temperature of the total batch, preferably to temperatures of >190° C.

TABLE 2

| Example | Batch | Shore C Hardness DIN 53505 (Apr. 1967) | Wear Test Acc. to DIN 51963-A as Loss in Thickness [mm] |
|---|---|---|---|
| 1 | 30 wt. % EVA(28% VA) 69 wt. % Chalk 1 wt. % Colorant | 77.3 | 0.167 |
| 11 | 25 wt. % EVA(28% VA) 5 wt. % EVA(45% VA) 69 wt. % Chalk 1 wt. % Colorant | 75.0 | 0.192 |

TABLE 2-continued

| Example | Batch | Shore C Hardness DIN 53505 (Apr. 1967) | Wear Test Acc. to DIN 51963-A as Loss in Thickness [mm] |
|---|---|---|---|
| 12 | 25 wt. % EVA (18.3% VA) 5 wt. % EVA(45% VA) 69 wt. % Chalk 1 wt. % Colorant | 75.3 | 0.253 |
| 13 | 30 wt. % EVA(20% VA) 69.5 wt. % Kaolin 0.5 wt. % Colorant | 83.6 | 0.245 |
| 14 | 30 wt. % EVA(28% VA) 62 wt. % Chalk 7 wt. % Wood Flour 1 wt. % Colorant | 79.3 | 0.205 |
| 15 | 10 wt. % EVA(20% VA) 10 wt. % EVA(28% VA) 5 wt. % EVA(45% VA) 54 wt. % Chalk 20 wt. % Kaolin 1 wt. % Colorant | 71.3 | 0.225 |

TABLE 3

| Example | Batch | Shore C Hardness DIN 53505 (Apr. 1967) | Wear Test Acc. to DIN 51963-A as Loss in Thickness [mm] |
|---|---|---|---|
| 16 | 27 wt. % EVA(28% VA) 51 wt. % Chalk 20 wt. % Kaolin 1 wt. % Calcium Stearate 1 wt. % Colorant | 76 | 0.23 |
| 17 | 30 wt. % EVA(28% VA) 68 wt. % Chalk 1 wt. % Calcium Stearate 1 wt. % Colorant | 75 | 0.16 |
| 18 | 37 wt. % EVA(28% VA) 61 wt. % Chalk 1 wt. % Calcium Stearate 1 wt. % Colorant | 68 | 0.14 |
| 19 | 50 wt. % EVA(28% VA) 48 wt. % Chalk 1 wt. % Calcium Stearate 1 wt. % Colorant | 62 | 0.09 |
| 20 | 60 wt. % EVA(28% VA) 38 wt. % Chalk 1 wt. % Calcium Stearate 1 wt. % Colorant | 58 | 0.06 |
| 21 | 68 wt. % EVA(28% VA) 30 wt. % Chalk 1 wt. % Calcium Stearate 1 wt. % Colorant | 57 | 0.04 |

TABLE 4

| Example | Batch | Shore C Hardness DIN53505 (Apr. 1967) | Wear Test DIN51963-A Loss in Thickness [mm] | Onset of Tackiness Kofler Bench [°C.] |
|---|---|---|---|---|
| 22 | 30 wt. % EVA (28% VA) 51 wt. % Chalk 1 wt. % Calcium Stearate 1 wt. % Colorant | 76 | 0.23 | 100 |
| 23 | 20 wt. % EVA | 81 | 0.25 | 137 |

TABLE 4-continued

| Example | Batch | Shore C Hardness DIN53505 (Apr. 1967) | Wear Test DIN51963-A Loss in Thickness [mm] | Onset of Tackiness Kofler Bench [°C.] |
|---|---|---|---|---|
|  | (28% VA) |  |  |  |
|  | 10 wt. % Polyethylene*) |  |  |  |
|  | 69 wt. % Chalk |  |  |  |
|  | 1 wt. % Colorant |  |  |  |
| 24 | 27 wt. % EVA (28% VA) | 79 | 0.20 | 200 |
|  | 3 wt. % Polypropylene**) |  |  |  |
|  | 48 wt. % Chalk |  |  |  |
|  | 20 wt. % Kaolin |  |  |  |
|  | 1 wt. % Calcium Stearate |  |  |  |
|  | 1 wt. % Colorant |  |  |  |
| 25 | 22.5 wt. % EVA (28% VA) | 80 | 0.20 | >200 |
|  | 7.5 wt. % Polypropylene**) |  |  |  |
|  | 48 wt. % Chalk |  |  |  |
|  | 20 wt. % Kaolin |  |  |  |
|  | 1 wt. % Calcium Stearate |  |  |  |
|  | 1 wt. % Colorant |  |  |  |

*)PE: "Lupolen" 1800 S, BASF
**)PP: "Novolen" 1300 E, BASF

BEST MODE OF REALIZING THE INVENTION

A batch consisting of
(I) 31.8% by weight of binder comprising
  (a) 76.7% by weight of EVA with 28% by weight VA proportion ("Riblene" DJV 1055X, Enichem),
  (b) 18.9% by weight of polypropylene ("Novolen" 1300 E, BASF),
  (c) 2.5% by weight of EPDM ("Buna" AP 437, Hüls AG)
  (d) 1.9% by weight of PE ("Baylon" 23 L 100, Bayer AG)
  [proportions (a) through (d) based on the binder],
(II) 47.3% by weight of chalk ("Calcilit" 8, ALPHA),
(III) 18.5% by weight of kaolin (grade RC 32 K, Sachtleben),
(IV) 1.3% by weight of antistat ("Lankrostat"),
(V) 1% by weight of colorant,
(VI) 0.1% by weight of antioxidant ("Irganox" 1010)
was processed corresponding to Example 2 into four batches of in each case unicolored granulates; these were further processed in accordance with Example 8 into sheeting.

The physical properties were:

| | |
|---|---|
| Thickness [mm] | 2.047 |
| Bulk density [g cm$^{-3}$] | 1.738 |
| Shore C hardness according to DIN 53505 (Apr. 1967) | 80.0 (10 s) |
| Wear test according to DIN 51963-A (Dec. 1980): | |
| Weight loss [g] | 3.5 |
| Loss in thickness [mm] | 0.14 |
| Mandrel flexure test according to DIN 51949 (longitudinal and transverse) | 15 |
| Leakage resistance according to DIN 51953 | $3 \cdot 10^8 - 1 \cdot 10^9$ ohm |

The batch exhibited a high tackiness temperature of >200° C. and could be processed without any problems. The sheeting was distinguished by an especially good high-temperature stability, high toughness and flexibility, very good surface properties, with low dirt catching ability, and with antistatic behavior.

We claim:

1. Homogeneous synthetic resin sheet or panel, of a multicolor structure, containing ethylene-vinyl acetate copolymer (EVA) and at least one of polyethylene and polypropylene, and optionally a copolymer of ethylene and propylene as a polymeric binder and having contents of fillers and optionally auxiliary agents, characterized in that the vinyl acetate proportion in the total batch of the synthetic resin sheet or panel is 3-14% by weight, the proportion of the fillers including the auxiliary agents is 35-80% by weight of the total batch and the content of the copolymer of ethylene and propylene is less than 5% by weight, based on the proportion of the binder.

2. Synthetic resin sheet or panel according to claim 1, characterized by containing the the at least one of polyethylene and polypropylene in amounts up to 15% by weight of the total batch.

3. Synthetic resin sheet or panel according to claim 2, characterized by utilizing a polypropylene which raises the tackiness temperature of the total batch to a temperature of >160° C.

4. Synthetic resin sheet or panel according to claim 3, characterized in that the binder consists of
  (a) 70-85% by weight of EVA,
  (b) 10-28% by weight of PP,
  (c) 1-5% by weight of EPDM and
  (d) 0-5% by weight of PE
in total 100% by weight and
and the total batch consists of
  (I) 25-35% by weight of binder,
  (II) 61-74% by weight of filler,
  (III) 0-2% by weight of antistat,
  (IV) 0.1-2% by weight of colorant,
  (V) 0-0.5% by weight of antioxidant
in total 100% by weight.

5. Synthetic resin sheet or panel according to one of claims 1 and 2-4 characterized in that the vinyl acetate content in the total binder is 14-35% by weight.

6. Synthetic resin sheet or panel according to claim 1, characterized by containing, as the binder, in addition to E/VA a polypropylene homopolymer.

7. Process for the production of multicolor-structured, homogeneous synthetic resin sheets or panels according to claim 1 wherein several, in each case unicolor-dyed batches are processed into granulates or chips each having different colors these granulates or chips being mixed together and—optionally after additional process steps—being press molded into the synthetic resin sheets or panels, characterized in that the individual, mutually differently colored granulates or chips are obtained by uniform mixing, completely plastifying preceding, simultaneous, or subsequent to the mixing, and subsequently granulating or comminuting said batches containing
20–65% by weight of the binder,
35–80% by weight of a filler and
up to 5% by weight of a colorant component.

8. Process according to claim 7, characterized in that the batches, containing binder, fillers and a colorant component, are completely plastified and mixed on a rolling mill and are comminuted by subsequent grinding or the like to the individual, mutually differently colored chips.

9. Process according to claim 7, characterized in that the batches of binder, fillers and the colorant component are uniformly mixed by means of a mixing device at a temperature below the softening temperature of the binders utilized and are subsequently completely plastified in an extruder into the individual granulates, each of which has a different color.

10. Process according to one of claims 7–9, characterized in that the intermixed, mutually differently colored granulates or chips are plastified and mixed incompletely with each other by shear stress into a multicolored marbled composition, and that this multicolored marbled composition is then molded and pressed—optionally after further process steps—into marbleized, homogeneous synthetic resin sheets or panels.

11. Process according to one of claims 7–9, characterized in that the intermixed, mutually differently colored granulates or chips are, by means of an extruder, plastified and incompletely mixed by shear stress into a multicolor-marbled composition, which latter is forced through a die and granulated into inherently multicolor-marbled granulates which are subsequently—optionally after additional process steps—press molded into marbleized, homogeneous synthetic resin sheets or panels.

12. Process according to one of claims 7–9, characterized in that the intermixed, mutually differently colored granulates or chips are, by means of a rolling mill, plastified and mixed incompletely by shear stress into a multicolor-marbled rolled slab which is subsequently press molded into marbleized, homogeneous synthetic resin sheets or panels.

13. Process according to one of claims 7–9, characterized in that the intermixed, mutually differently colored granulates or chips are plastified on a rolling mill and, by shear stress, mixed incompletely with one another into a multicolored marbled rolled slab, and that this rolled slab is subsequently comminuted by grinding or the like into inherently multicolor-marbled chips which are subsequently further processed into marbled, homogeneous synthetic resin sheets or panels.

14. Process according to one of claims 7–9, characterized in that the binder contains at least 50% by weight of ethylene-vinyl acetate copolymer.

15. Process according to claim 14, characterized in that the binder consists of one or several ethylene-vinyl acetate copolymers, the vinyl acetate content in the ethylene-vinyl acetate copolymers amounting in each case to 14–45% by weight.

16. Process according to claim 15, characterized in that the vinyl acetate content, based on the total batch, is 5–10% by weight.

17. Process according to one of claims 7–9, characterized in that the binder contains, besides 50–99% by weight of ethylene-vinyl acetate copolymer, 1–50% by weight of the at least one of polyethylene and polypropylene wherein the proportion of the the at least one of polyethylene and polypropylene in the total batch is up to 15% by weight.

18. Process according to one of claims 7–9, characterized in that the proportion of filler in the total batch is 50–75% by weight.

19. Process according to one of claims 7–9, characterized by using chalk and/or kaolin as the filler.

20. Process according to claim 11, characterized in that the multicolor-marbled granulates are press molded by means of a knurled roll mill into the marbleized, homogeneous synthetic resin sheets.

21. Process according to claim 11, characterized in that the multicolor-marbled granulates are press molded by means of a twin belt press into the marbleized, homogeneous synthetic resin sheets.

22. Process according to claim 13, characterized in that the multicolor-marbled chips are press molded by means of a knurled roll mill into the marbleized, homogeneous synthetic resin sheets.

23. Process according to claim 13, characterized in that the multicolor-marbled chips are press molded by means of a twin belt press into the marbleized, homogeneous synthetic resin sheets.

* * * * *